United States Patent Office 3,181,831
Patented May 4, 1965

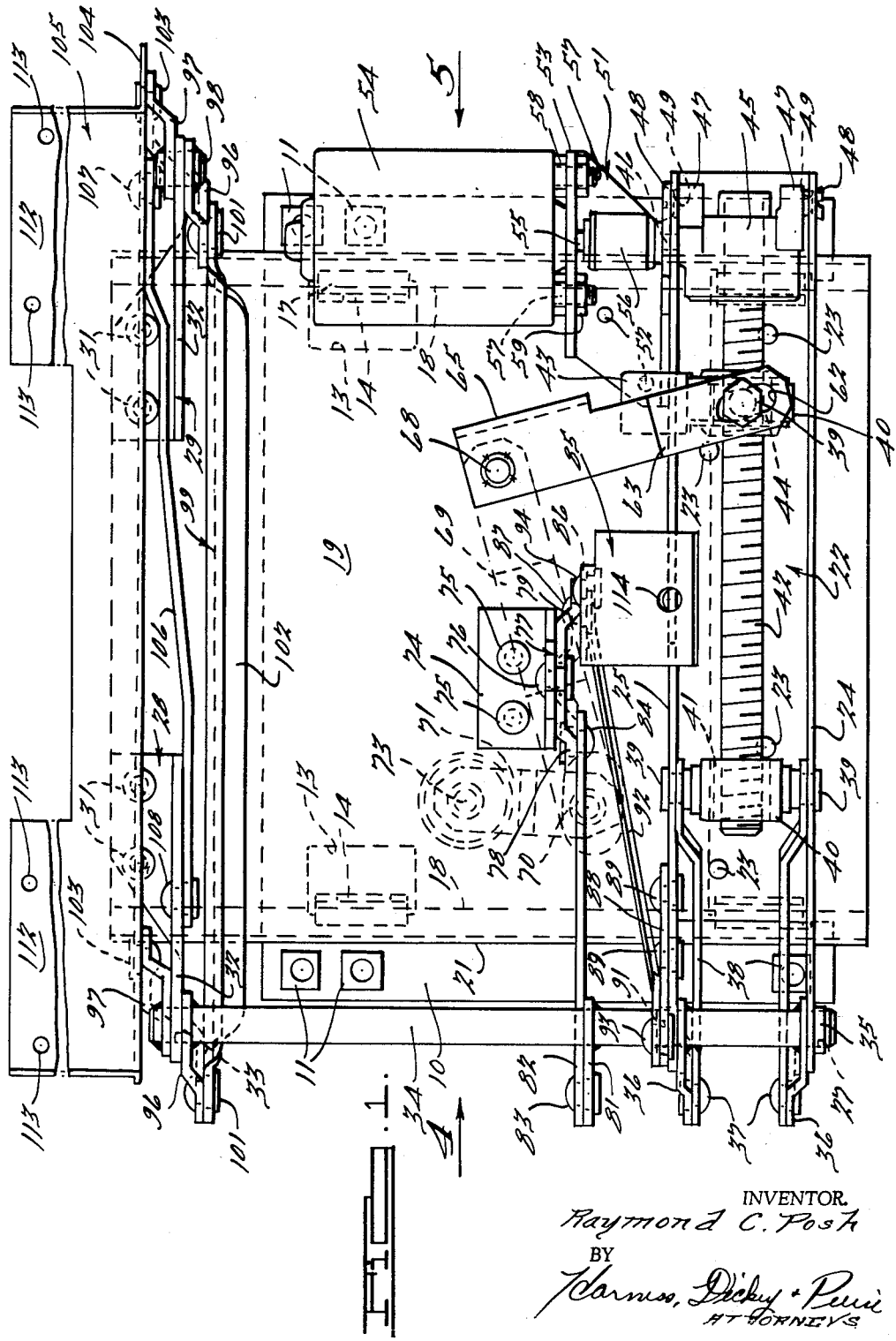

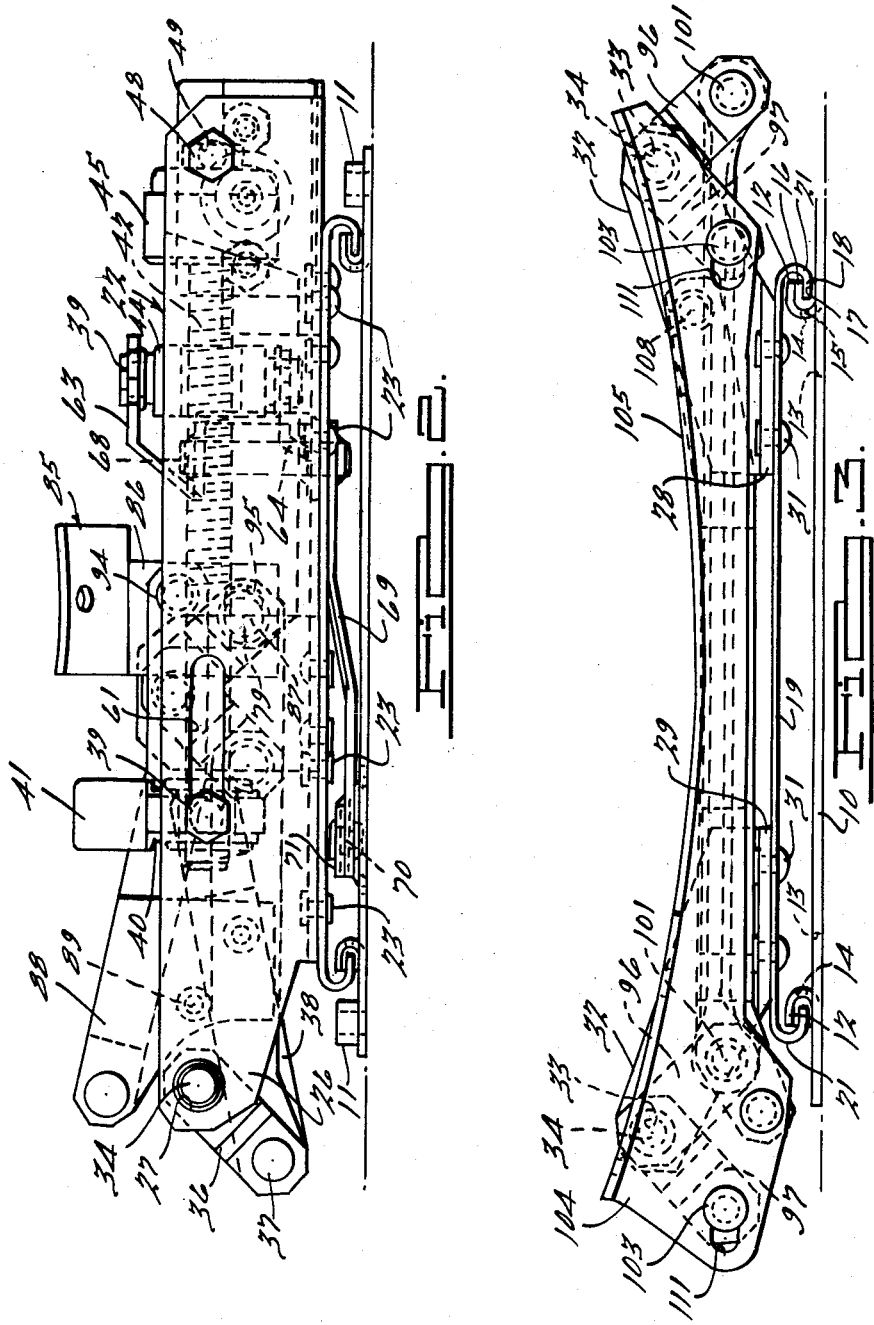

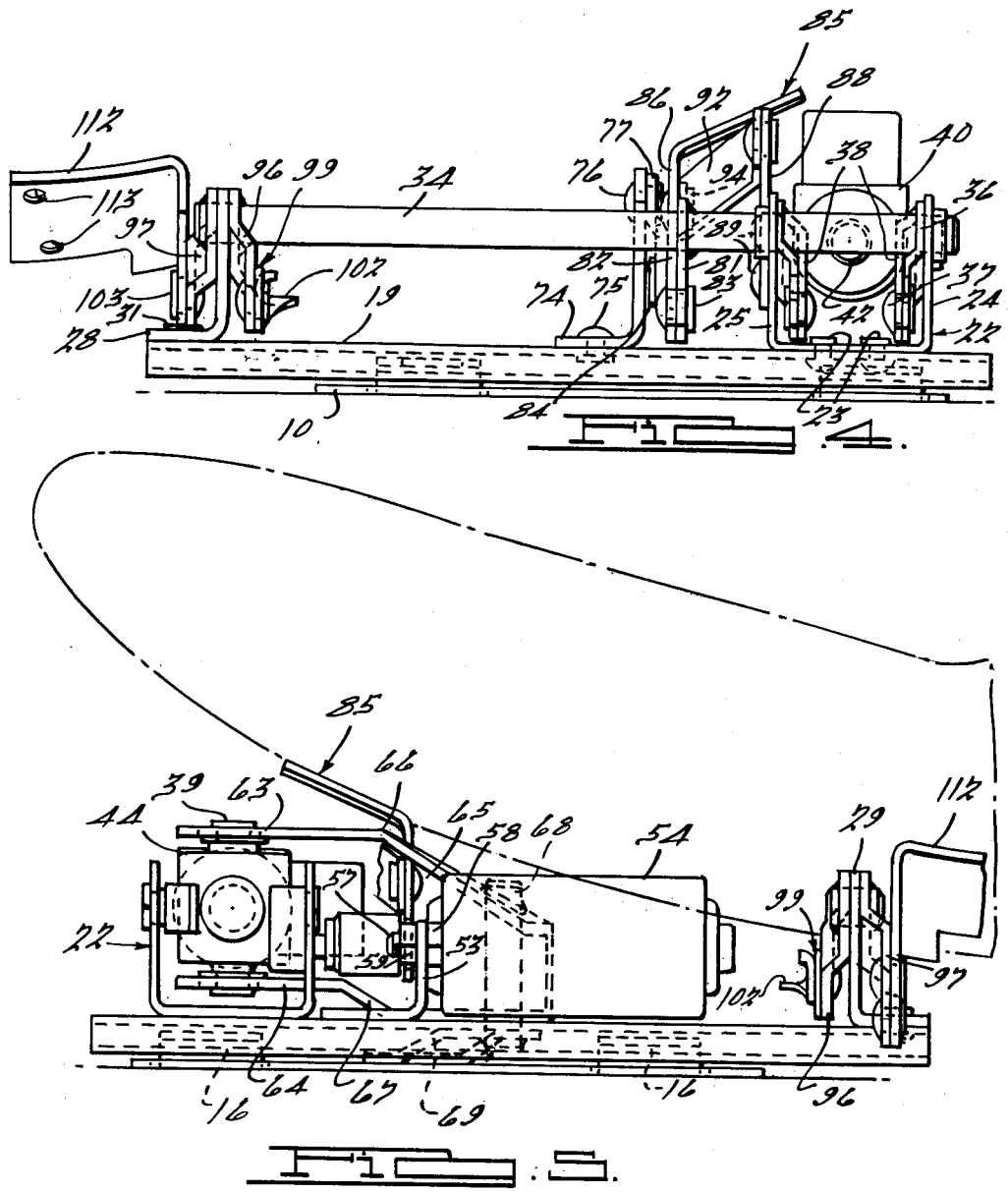

3,181,831
SEAT SUPPORTING MECHANISM
Raymond C. Posh, Garden City, Mich., assignor to American Metal Products Company, Detroit, Mich., a corporation of Michigan
Filed Sept. 26, 1962, Ser. No. 226,254
9 Claims. (Cl. 248—421)

This invention relates to seat supporting mechanisms, and particularly to a seat supporting mechanism which has driving and operating elements disposed transversely of the seat which is supported thereby.

It has been the practice in the art to construct seat supporting mechanisms with the driven lead screw and the supporting and operating elements disposed at each side of the seat forward and rearwardly thereof.

The present invention embodies a seat supporting structure having the lead screw and the supporting and operating elements disposed transversely of the seat at the forward and rearward edges thereof. While such a seat supporting mechanism may be employed for raising, lowering and forwardly and rearwardly adjusting a seat which extends across the entire width of the body, the mechanism has special applications for supporting a bucket type of seat for an individual occupant. A base plate has horizontally presenting channels positioned thereon forming guideways for supporting a plate disposed thereabove. The supporting plate has side edges reversely bent and disposed within the channel portions of the base plate where it is supported for forward and rearward movement within slots in low friction blocks secured within the channel portions. A swingable link is secured to the base plate by having one end pivoted to a freely movable link which is pivoted to the plate. The opposite end of the swingable link is joined to a vertical shaft pivoted to the upper plate and operated by an arm on the upper end thereof which is actuated by a nut on a lead screw which causes the supporting plate to move forwardly and rearwardly when the shaft is rotated.

An additional nut on the lead screw operates links which rotate a shaft along one edge of the structure, having arms thereon which move the links transversely to rotate bell cranks to thereby raise or lower the seat depending upon the direction of movement of the nut. One set of arms of the bell crank at opposite sides of the seat is interconnected by a link to cause them to operate simultaneously, and a loose connection is provided between the ends of the other or lifting arms of the bell cranks and the portions of the mechanism being raised thereby. Side shifting of the seat is prevented by additional links of substantial length pivoted to the supporting plate and to the seat supporting mechanism. A motor is mounted on the supporting plate which drives the lead screw in the conventional manner, and solenoids are provided on the nuts by which they may be held against rotation to thereby be driven along the lead screw.

Accordingly, the main objects of the invention are: to provide a compact seat supporting mechanism having transversely disposed operating elements for raising and lowering and moving the seat forwardly and rearwardly; to provide a seat supporting mechanism having a pair of plates connected by interrelated pairs of channel elements which have relative sliding movement on low friction blocks supported on one set of the channel elements; to mount raising and lowering mechanism on a support plate which has transversely disposed bell cranks simultaneously operated by links which are actuated by a nut secured in driving relation on a lead screw which is also transversely disposed on a supporting plate; to provide base plates for relative forward and rearward movement by the operation of arms on a vertical shaft from a nut on a transversely disposed lead screw which also selectively operates mechanism for raising and lowering the seat which is retained against lateral shifting by links supported on the movable plate and on the ends attached to the raising and lowering portions of the mechanism, and, in general, to provide a seat supporting mechanism for raising, lowering and advancing a seat which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a plan view of a seat supporting mechanism embodying features of the present invention;

FIG. 2 is a front view of a seat supporting mechanism illustrated in FIG. 1;

FIG. 3 is a view of the rear portion of the raising and lowering mechanism illustrated in FIG. 1;

FIG. 4 is a left-hand side view of mechanism illustrated in FIG. 1, as viewed from the point 4 thereof, and FIG. 5 is a right-hand view of the mechanism illustrated in FIG. 1, as viewed from the point 5 thereof.

Referring to the drawings, the seat supporting mechanism of the present invention embodies a base plate 10 which is attachable to a floor by screws extending into nuts 11 which are secured to the top surface of the plate. Four channel elements 12 are formed from the metal of the base plate which is sheared therefrom at the points 13 and rolled outwardly into channel shape. The webs of the channel elements have apertures 14 therein for receiving a projecting end 15 of a low friction block 16 which is retained in the channel elements thereby against movement longitudinally thereof. The low friction blocks contain an outwardly presenting slot 17 into which the free ends 18 of a supporting plate 19 extend. The supporting plate has its side edges reversely bent downwardly and inwardly to form inwardly presented channel portions 21 and the free edges 18. The supporting plate 19 is movable backwardly and forwardly in the slot 17 of the low friction block 16 by a mechanism hereinafter to be described.

An upwardly facing channel member 22 is disposed transversely of the supporting plate 19 at the front end thereof to which it is secured by a plurality of rivets 23. The side flanges 24 and 25 of the channel element 22 project outwardly to form extending arms 26 containing aligned apertures 27. Like brackets 28 and 29 are secured to the rear end of the supporting plate 19 by rivets 31. The brackets have outwardly extending arms 32 projecting beyond the side edges of the plate 19 containing an aperture 33. A shaft 34 extends through the aperture 33 at the left-hand side of the seat, as viewed in FIG. 1, and through the apertures 27 in the extending arms 26 of the channel member 22. The apertures 27 are drawn from the metal of the arms 26 to provide collars 35 which increase the bearing area of the apertures. A pair of arms 36 is welded to the shaft 34 between the arms 26 of the channel member. The free ends of the arms 36 are secured by a pair of rivets 37 to links 38 which are connected to the operating mechanism.

The operating mechanism extends transversely of the supporting plate 19 and includes movable nuts 41 and 44, a lead screw 42 and a driving motor 54 operably connected to the lead screw 42. The links 38 are pivoted on studs 39 of the solenoid operated nut 41 which is threaded on lead screw 42 in a manner as illustrated and claimed in Patent 2,857,776 to R. J. Williams et al. which issued October 28, 1958, and was assigned to the assignee of the present invention.

As herein illustrated, the studs 39 are threaded into a case 40 in which the nut may rotate or be retained stationary through the energization of a solenoid 43 which applies a braking force to the nut. The lead screw 42 contains a second nut 44 and is driven from a worm wheel within a housing 45 from a worm on a shaft 46 extending therefrom. The housing 45 has bosses 47 thereon containing a thread in which studs on taper-headed screws 48 are threaded, with the tapered surface of the head engaging the edge of apertures 49 in the flanges 24 and 25 of the channel element 22. An angle bracket 51 has one branch secured by rivets 52 to the supporting plate 19, the other branch providing a bifurcated upstanding portion 53. A motor 54 has its shaft 55 joined by a driving sleeve 56 to the shaft 46 of the worm. A pair of studs 57 of the motor extends through the apertures in the upstanding portion 53, and nuts 58 on the stud engage the portion 53 in aligned relation thereto when nuts 59 are threaded on the stud and engage the opposite face of the flange.

When the motor is operated to drive the lead screw 42 clockwise, the nut 41, when held against rotation, will move to the right, pulling the links 38 and swinging the arms 36 to the right, thereby rotating the shaft 34 counterclockwise. When the motor 54 is reversed, the nut 41 will be advanced to the left on the lead screw 42, advancing the link 38 and swinging the arms 36 to the left, thereby rotating the shaft 34 in a reverse or clockwise direction. The studs 39 operate in slots 61 in the flanges 24 and 25 of the channel member 22 and prevent the case 40 of the nut assembly from turning while supporting the forward end of the lead screw 42 in aligned relation with the center of the worm gear housing 45.

Similar studs 39 on the case of a second nut 44 of the lead screw extend through elongated apertures 62 in the ends of aligned arms 63 and 64 which are joined together at the opposite ends by a web 65. The arm 63 is bent downwardly at 66 and the arm 64 is offset at 67 so that the lower portion of the arm 64 will rest upon the supporting plate 19. The connected ends of the arms have a stub shaft 68 extending therethrough which is welded or otherwise secured thereto. The lower portion of the stub shaft 68 extends through the supporting plate 19 and is welded to an arm 69 disposed at right angle to the arms 63 and 64. The free end of the arm 69 is mounted for limited movement either in a slot or secured by a pivot 70 to the end of a link 71 which is secured to the base plate 10 by a pivot 73. When the nut assembly 44 is moved longitudinally on the lead screw 42, the stub shaft 68 will rotate and cause the plate 19 to move forwardly and rearwardly about the pivot 70 which connects the arm 69 to the link 71. Since the stub shaft 68 is disposed in fixed relation relative to the blocks 16 on which the supporting plate 19 slides, the pivot 70 must move laterally as the arm 69 swings through an arc to permit the forward or rearward movement of the supporting plate 19 on the blocks 16.

An angle bracket 74 is secured by rivets 75 to the central portion of the supporting plate 19, the bracket having an aperture through which a rivet 76 extends to pivotally secure the central aperture of the bell crank 77 thereto. The bell crank has a pair of arms 78 and 79 in substantially right-angle relation to each other. An arm 81 is welded or otherwise fixedly secured to the shaft 34 to the free end of which a link 82 is pivotally secured by a rivet 83. The opposite end of the link 82 is secured by a rivet 84 to the arm 78 of the bell crank 77. A seat supporting bracket 85 has a downwardly extending flange 86 to the lower portion of which the end of the arm 79 of the bell crank 77 is pivotally secured by a rivet 87. A plate 88 is secured by rivets 89 to the outer face of the arm 26 of the flange 25 of the channel members 22. The plate 88 has an aperture 91 in its forward end to which one end of a link 92 is pivotally secured by a rivet 93. The opposite end of the link 92 engages the flange 86 of the bracket 85 to which it is pivotally secured by a rivet 94 disposed above the rivet 87.

Since vertical movement of bracket 85 is dependent upon pivotal movement of link 92 and bell crank 77, having differing radii of rotation, bracket 85 must be provided with means to permit one of the connections between it and the levers or links 92 and 77 to move laterally thereof with vertical movement. To this end, and as illustrated in FIG. 2, the rivet 87 extends through a lateral slot 95 in the arm 79 to permit relative sideways movement of the rivet therein so as to permit the link 92 to cause the flange 86 and the bracket 85 to move more nearly in an exact vertical plane, because of its longer radius of rotation about pivot 93. The sideways movement of the rivet 94 when moved vertically is slight because of the length of the link 92 as compared to crank arm 79. The bell crank arm 79 is of short length and the seat would move laterally a substantial amount if the apertures 95 were not elongated. Thus, by permitting movement of bracket 85 about the pivot point 93, wherein link 92 is relatively long and the arc in which rivet 94 travels is quite shallow, slot 95 permits rivet 87 to travel in its short radius arc without imparting horizontal movement to bracket 85, but still imparting vertical movement to the bracket.

Crank arms 96 and 97 are welded or otherwise secured to the shaft 34 on opposite sides of the upwardly extending arm 32 of the angle bracket 28. The arms 96 and 97 are substantially in right angular relation to each other. Similar arms 96 and 97 are welded or otherwise secured to a stub shaft 98 on opposite sides of the upwardly extending arm 32 of the bracket 29, with the arms disposed in right angle relation to each other. An operating link 99 is secured by pivots 101 to the ends of the arms 96, the portion of the link between the pivots being of U-shaped section 102, as illustrated in FIG. 4, for the purpose of reducing the vertical width thereof. Rivets 103 secure the downwardly extending flange 104 of the rear seat supporting bracket 105 in pivoted relation on the ends of the arms 97. A link 106 has one end secured to the right-hand portion of the flange 104 by a rivet 107, the opposite end being secured by a rivet 108 to the upstanding arm 32 of the bracket 28. The link 106 functions in the same manner as the link 92 for preventing a substantial side movement of the seat which would otherwise occur if the rivets 103 were not permitted to move laterally in slots 111 in the flange 104 of the seat supporting bracket 105, as clearly illustrated in FIG. 3. The seat supporting bracket is extended rearwardly at 112 and is provided with apertures 113 by which the rear portion of the seat is secured. Similarly, the seat supporting bracket 85 has an aperture 114 therein by which the central forward portion of the seat is secured in fixed relation to the bracket.

When the seat is to be advanced forwardly, a switch is actuated in a direction to operate the lead screw counterclockwise to thereby drive the nut assembly 44 thereon when prevented from rotating to the left, as viewed in FIG. 1, which movement rotates the shaft 68 and forces the seat forwardly relative to the pivot 70 which is movably secured to the base plate 10. Upon reversing the motor and holding the nut 44 against rotation, the nut assembly will be driven to the right, thereby forcing the plate 19 and the seat to the rear on the low friction blocks 16. When it is desired to raise the seat, a switch is actuated to drive the lead screw in a counterclockwise direction, moving the nut assembly 41 to the right when the solenoid 43 thereof is energized. This movement rotates the shaft 34 counterclockwise and produces an upward movement of the ends of the arms 79 and 97, thereby raising the seat vertically. Such movement will be substantially vertical due to the stabilizing links 92 and 106 which force the rivets 87 and 103 to move, respectively, in the slots 95 and 111. To lower the seat, the motor 54 is energized in a reverse direction, driving lead screw 42 in a counterclockwise direction and advancing the nut assembly 41 forwardly to the position illustrated at which the seat is in its lowermost position.

What is claimed is:

1. In a seat supporting structure, a base member, a supporting element mounted on said base member for forward and rearward movement, an operating mechanism disposed transversely at the forward portion of the supporting element, means connecting said base member and said supporting element and embodying a vertical shaft operably connected to and operated by said mechanism, said mechanism being operably to rotate said shaft and move said supporting element on said base member forwardly and rearwardly thereof.

2. In a seat supporting structure, a base member, a supporting element mounted on said base member for forward and rearward movement, an operating mechanism disposed transversely at the forward portion of the supporting element, means connecting said base member and said supporting element and embodying a vertical shaft operably connected to and operated by said mechanism, said mechanism being operable to rotate said shaft and move said supporting element on said base member forwardly and rearwardly thereof, transversely disposed means on said supporting element for supporting a seat, and means for raising and lowering said transversely disposed means actuated by said transversely disposed operating mechanism.

3. In a seat supporting structure, a base member, a supporting element mounted on said base member for forward and rearward movement, transversely disposed raising and lowering means at the forward and rear portions of the supporting element for supporting a seat for vertical adjustment, a transversely disposed lead screw mounted on said supporting element, a nut on said lead screw, means for driving said lead screw in rotation, a shaft pivotally supported along one edge of the supporting element, arms on said shaft, links connected to said nut and one of said arms and from other of said arms to said raising and lowering means for vertically moving the seat in opposite directions when the nut is driven in opposite directions on said lead screw, a vertical shaft pivoted on said supporting element, a second nut on said lead screw, and arms on said shaft one secured to said second nut and the other having a loose connection with the base member for producing a fore and aft movement of the supporting element.

4. In a seat supporting mechanism, a base element, a supporting element on said base element mounted for fore and aft movement relative thereto, a pair of transversely disposed bell cranks pivotally supported along the rear edge of said supporting element each having a pair of angularly disposed arms, a link connecting one of said arms of each of said bell cranks to have the bell cranks move simultaneously, a transversely disposed seat supporting bracket secured to the other arms of the bell cranks with a loose connection therebetween, the pivot of one of said bell cranks being a shaft fixed thereto and pivotally mounted at one side of the supporting element, an arm on said shaft, a bell crank pivotally attached to said supporting element forwardly of said pair of bell cranks and having a pair of arms, a link secured to the arm of the shaft and to one arm of said last bell crank, a forward seat supporting bracket pivoted to the other arm of the last said bell crank, and means for rotating said shaft.

5. In a seat supporting mechanism, a base element, a supporting element on said base element mounted for fore and aft movement relative thereto, a pair of transversely disposed bell cranks pivotally supported along the rear edge of said supporting element each having a pair of angularly disposed arms, a link connecting one of said arms of each of said bell cranks to have the bell cranks move simultaneously, a transversely disposed seat supporting bracket secured to the other arms of the bell cranks with a loose connection therebetween, the pivot of one of said bell cranks being a shaft fixed thereto and pivotally mounted at one side of the supporting element, an arm on said shaft, a bell crank pivotally attached to said supporting element forwardly of said pair of bell cranks and having a pair of arms, a link secured to the arm of the shaft and to one arm of said last bell crank, a forward seat supporting bracket pivoted to the other arm of the last said bell crank, means for rotating said shaft, and links of substantial length pivoted to said supporting element and to said seat supporting brackets for limiting the lateral movement of the seat supporting brackets when moved vertically.

6. In a seat supporting mechanism, a base element, a supporting element on said base element mounted for fore and aft movement relative thereto, a pair of transversely disposed bell cranks pivotally supported along the rear edge of said supporting element each having a pair of angularly disposed arms, a link connecting one of said arms of each of said bell cranks to have the bell cranks move simultaneously, a transversely disposed seat supporting bracket secured to the other arms of the bell cranks with a loose connection therebetween, the pivot of one of said bell cranks being a shaft fixed thereto and pivotally mounted at one side of the supporting element, an arm on said shaft, a bell crank pivotally attached to said supporting element forwardly of said pair of bell cranks and having a pair of arms, a link secured to the arm of the shaft and to one arm of said last bell crank, a forward seat supporting bracket pivoted to the other arm of the last said bell crank, means for rotating said shaft, links of substantial length pivoted to said supporting element and to said seat supporting brackets for limiting the lateral movement of the seat supporting brackets when moved vertically, said means for rotating said shaft embodying a lead screw disposed transversely of and attached to said supporting element, a pair of solenoid lockable nuts on said lead screw, an operating arm on said shaft, and a link connecting one of said nuts to the end of the operating arm for rotating the shaft in opposite directions when the lead screw is driven clockwise and counterclockwise.

7. In a seat supporting mechanism, a base element, a supporting element on said base element mounted for fore and aft movement relative thereto, a pair of transversely disposed bell cranks pivotally supported along the rear edge of said supporting element each having a pair of angularly disposed arms, a link connecting one of said arms of each of said bell cranks to have the bell cranks move simultaneously, a transversely disposed seat supporting bracket secured to the other arms of the bell cranks with a loose connection therebetween, the pivot of one of said bell cranks being a shaft fixed thereto and pivotally mounted at one side of the supporting element, an arm on said shaft, a bell crank pivotally attached to said supporting element forwardly of said pair of bell cranks and having a pair of arms, a link secured to the arm of the shaft and to one arm of said last bell crank, a forward seat supporting bracket pivoted to the other arm of the last said bell crank, means for rotating said shaft, links of substantial length pivoted to said supporting element and to said seat supporting brackets for limiting the lateral movement of the seat supporting brackets when moved vertically, said means for rotating said shaft embodying a lead screw disposed transversely of and attached to said supporting element, a pair of solenoid lockable nuts on said lead screw, an operating arm on said shaft, a link connecting one of said nuts to the end of the operating arm for rotating the shaft in opposite directions when the lead screw is driven clockwise and counterclockwise, a bell crank embodying a pair of arms secured to a vertical shaft extending through said supporting element with one arm disposed therebelow and connected to said base element by a lost motion connection, and means connecting the arm located above the supporting element to the second nut for moving said supporting element forwardly and rearwardly on said base element by the opposite directions of movement of the nut on the lead screw.

8. In a seat supporting mechanism, a base member, a seat supporting element mounted on said base member for movement forwardly and rearwardly thereof, a vertical shaft extending through said supporting element having a pair of arms one thereabove and the other therebelow, loose connecting means for securing the lower arm to the base member, and means for moving the upper arm for rotating the shaft and causing the lower arm to force the shaft and the supporting element to move on the base member.

9. In a seat supporting element, a base plate having a plurality of flanges sheared therefrom inwardly of the edges thereof, said flanges being formed outwardly into channel elements which are parallel to the plate side edges, slotted low friction blocks supported in said channel elements, a seat supporting plate having the side edges formed downwardly and inwardly to provide parallel flanges, the edge of the flanges extending into the slot in the low friction blocks for movement therein, said blocks having a rearwardly extending projection and said channel elements having apertures into which the extending projections are locked for securing the blocks in the channel elements against longitudinal movement therein, a vertical shaft pivotally secured to said supporting plate, an arm below said supporting plate secured to said shaft, a loose connection means securing said arm to said base plate, an arm secured to said shaft above said supporting plate, and power means attached to said last arm for rotating the shaft and having said arm which is below the supporting plate cause the forward and rearward movement thereof and of said shaft therewith.

References Cited by the Examiner

UNITED STATES PATENTS

| 2,840,139 | 6/58 | Ragasadal | 248—430 |
| 2,919,744 | 1/60 | Tanaka et al. | 248—419 |
| 2,929,438 | 3/60 | Homier | 248—421 X |
| 2,929,439 | 3/60 | Tanaka et al. | 248—421 X |
| 2,942,647 | 6/60 | Pickles | 248—421 X |
| 3,079,118 | 2/63 | Pickles | 248—420 |

FOREIGN PATENTS 1,087,016  8/60  Germany.

CLAUDE A. LE ROY, *Primary Examiner*.

FRANK L. ABBOTT, *Examiner*.